United States Patent
Bahrs et al.

[11] Patent Number: 6,002,874
[45] Date of Patent: Dec. 14, 1999

[54] METHOD AND SYSTEM FOR TRANSLATING GOTO-ORIENTED PROCEDURAL LANGUAGES INTO GOTO-FREE OBJECT ORIENTED LANGUAGES

[75] Inventors: Peter Carl Bahrs; Barry Alan Feigenbaum, both of Austin, Tex.

[73] Assignee: International Business Machines Corporation, Armonk, N.Y.

[21] Appl. No.: 08/995,535

[22] Filed: Dec. 22, 1997

[51] Int. Cl.$^6$ .................................................. G06F 9/445
[52] U.S. Cl. ............................................................. 395/705
[58] Field of Search ............................... 395/705, 702, 395/701; 709/302

[56] References Cited

U.S. PATENT DOCUMENTS

| | | | |
|---|---|---|---|
| 4,860,204 | 8/1989 | Gendron et al. | 395/702 |
| 5,325,533 | 6/1994 | McInerney et al. | 395/701 |
| 5,379,432 | 1/1995 | Orton et al. | 709/303 |
| 5,404,529 | 4/1995 | Chernikoff et al. | 395/683 |
| 5,446,902 | 8/1995 | Islam | 395/703 |
| 5,455,951 | 10/1995 | Bolton et al. | 709/103 |
| 5,473,777 | 12/1995 | Moeller et al. | 709/302 |
| 5,475,845 | 12/1995 | Orton et al. | 709/302 |
| 5,586,330 | 12/1996 | Knudsen et al. | 395/705 |
| 5,845,299 | 12/1998 | Arora et al. | 707/513 |

*Primary Examiner*—Tariq R. Hafiz
*Assistant Examiner*—Chameli C. Das
*Attorney, Agent, or Firm*—Mark S. Walker; Leslie A. Van Leeuwen

[57] ABSTRACT

A method and system for translating goto-oriented procedural languages into object oriented languages. A class structure is selected into which the source program will be transformed. The class structure is selected based upon the granularity of translation. The lowest level of granularity involves the translation of each source program statement into an executable object in the resulting object oriented program. Highest level of granularity translates the entire source program into a single object in the resultant program. The transformation program causes the construction of an output program that creates instances of each object type with parameters based upon the input source program. The parameters can specify branching logic to replace goto statements and they involve generation of executable method code to implement processing logic of the procedural source program. Intermediate levels of granularity are also possible. The resulting program can be optimized to reduce memory and load times by replacing passing of statement index values with passing of the next executable object itself. Finally, dynamic loading of objects can be implemented to provide that object instances are created only as required for execution. This optimization reduces the memory requirements and speeds processing particularly in cases where significant portions of code are not executed.

20 Claims, 4 Drawing Sheets

METHOD AND SYSTEM FOR TRANSLATING GOTO-ORIENTED PROCEDURAL LANGUAGES INTO GOTO-FREE OBJECT ORIENTED LANGUAGES

BACKGROUND OF THE INVENTION

1. Field of the Invention

The present invention relates to computer systems and computer implemented processes for transforming computer program code. More particularly, the invention relates to automated transformation technology for analyzing procedural assembler style goto based source code and producing object oriented source code operable on modern computer systems.

2. Background and Related Art

The operation of computer systems is controlled by program code. The program code can comprise operating system code that controls the overall operation of the computer and application code which accomplishes a particular result desired by the computer owner. Over time companies have developed a large number of computer code programs related to their business and operations. Unfortunately, computer systems and computer system programming technologies have continued to evolve at a rapid pace. Much of the code existing in companies was written for earlier technological platforms and is often unable to take advantage of modern computing devices.

The development of object oriented computer languages has been described as one of the most significant technological changes to occur in the software industry. Object oriented systems are characterized by having encapsulation and inheritance. Encapsulation refers to the collection of data and functions for acting on that data (known as methods) into a single object. Inheritance allows a new object to extend or refine existing objects without repeating the data or code in that preexisting object.

One emerging new computer environment is the network computing (NC) environment. The network computing environment envisions software programs being stored on centrally managed server computers with portions of the code downloaded to run, as required, on the client computer. The Java language (Java is a trademark of Sun Microsystems, Inc.) is an object oriented language that supports a network computing environment. The following description will focus on transforming existing programs to programs written in the Java language but there is no restriction on the application of this invention to generation of other object oriented languages such as C++ and SmallTalk.

Existing procedural software source code has often been written as assembler language macros. Assembler language is goto (or branch) oriented and does not support modern structured programming control flow constructs. The programmer uses a "goto label" instruction to cause transfer of control in a program to the indicated "label." This approach produces a "wandering stack" program because the entries on the program stack are not clearly structured. Each "goto" can cause a branch to an arbitrary location. The control flow is not controlled by the stack. Structured programming, in contrast, supports constructs such as if/then/else conditionals, while loops and block structure. Structured language programs have a more coherent stack. Wien a structured block of code is completed, control returns to an earlier point by "popping" an entry off the stack. This stack does not "wander." Fourth generation languages such as C, Fortran, and Cobol suffer from the same problems as assembler language with much of the code written to use gotos rather than structured programming control flow constructs.

The Java language and most object oriented languages control the flow of program logic without the use of goto, branch constructions. Java does not have a "goto" statement. Transformation of procedural source code containing gotos into a language such as Java has historically been difficult to do requiring significant manual effort to perform the transformation.

Conversion of legacy programs into Java or other object oriented form is essential for companies to take advantage of emerging technologies including network computer technologies. The lack of an ability to easily and reliably convert legacy programs into object oriented programs forces companies to continue to use old, often inefficient, processing techniques. An automated process for converting legacy applications into object oriented applications, and particularly into programs operable in evolving NC environments will increase company data processing efficiencies and allow improved productivity for those companies.

There exists a technical problem of being able to automatically translate procedural, goto based source code into object oriented source code such as Java. There is a further technical problem of transforming the procedural code into object oriented source code that is efficiently executable on a computer system.

SUMMARY OF THE INVENTION

The present invention is therefore directed to providing a system and method for automatically transforming source code containing goto statements into source code implementing object oriented programming techniques.

The present invention is directed to a computer implemented method of translating a procedural source code program into an object oriented source code program comprising the steps of: selecting an object structure having a transformation granularity; receiving and parsing each statement of the procedural source code program to create a control flow and processing logic map; generating an output object oriented source program by: generating object class definitions and object methods based on the selected granularity and containing processing logic from the logic analysis; generating object initialization code by creating instances of each object required for program execution; and generating object invocation code for processing the generated objects in accordance with the control flow.

It is therefore an object of the invention to automatically transform goto based code and wandering stack based code into object-oriented stack-less code and constructs.

It is a further object of the invention to enable control of the granularity of source code transformation between procedural and object code modes.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention is directed to a system and method for transforming source code in the procedural language such as Assembler, Fortran, or C into an object oriented language such as Java, C++ or SmallTalk. The description of the preferred embodiment will focus on the transformation of Assembler code into Java language code, however, the invention disclosed herein is not limited to this use. Automatic transformation of any fourth generation goto based language into any goto-less object oriented language is within the scope of the invention.

Figure 1:
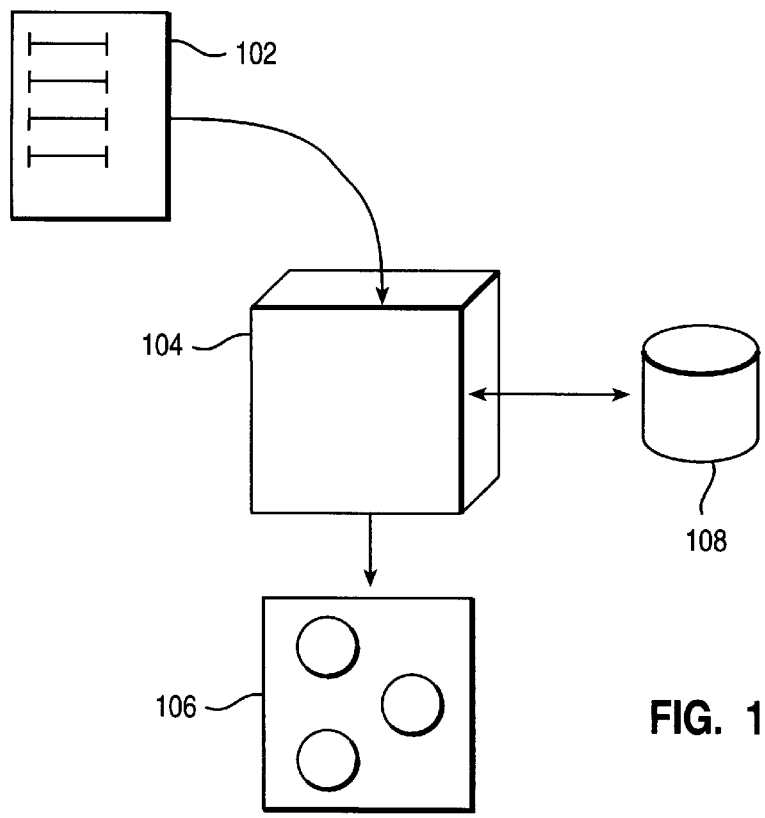
FIG. 1 is a block diagram illustrating the flow of the present invention.

The general problem of transforming source code is illustrated in FIG. 1. The original source code program 102, is processed by computer implemented transformation mechanism 104, to produce object oriented source code 106. Transformation mechanism 104 relies on transformation rules stored in a transformation database 108 on a storage device. The transformed code contains the initialization and control flow constructs necessary to cause the object oriented program to produce the functional result sought from the procedural code. The resulting object oriented code can be executed in an object oriented environment.

Transformation of Assembly language code into Java code requires that the procedural statements expressed in the source code be transformed into objects and object methods in the object oriented language. The selection of the objects to generate is a critical part of the transformation. The objects resulting from the code transformation can be at varying levels of granularity. For example, at the finest level of granularity each statement in the procedural language code can be transformed into a Java object. At the other end of the continuum, each procedural program as a whole can be transformed into a single object. In between these extremes, the procedural source code may be transformed into object oriented code with each paragraph comprising an object or, in certain circumstances, each file of source code comprising an object.

An object structure for each level of granularity provides an object framework supporting the transformation. The framework can be modified to adapt to different levels of granularity within the range specified.

The present invention will be discussed with reference to the following example of procedural source code.

EXAMPLE 1

| Loc | Source | | | |
|---|---|---|---|---|
| | | START | | START OF PROGRAM |
| | | DATA | DATA1,LENGTH=100 | DATA AREA DECLARATIONS |
| | | DATA | DATA2,LENGTH=200 | |
| | | DATA | DATA3,LENGTH=300 | |
| | | LITERAL | LITERAL1,'LITERAL STRING 1' | CONSTANT DECLARATIONS |
| | | LITERAL | LITERAL2,'LITERAL STRING 2' | |
| | | LITERAL | LITERAL3,'LITERAL STRING 3' | |
| | * other declarative statements. | | | |
| | * | | | |
| | * control flow begins | | | |
| | * | | | |
| 0000 | LABEL1 | LABEL | | |
| 0000 | | MOVE | (DATA1,TO,DATA2) | ASSIGN VALUE |
| 0001 | | READ | DATA3,ERROR1 | GET VALUE |
| 0002 | | IF | (DATA1,EQ,DATA3) | TEST VALUE |
| | | THEN | LABEL5 | |
| | | ELSE | | |
| 0003 | | MOVE | (DATA2,TO,DATA3) | ASSIGN VALUE |
| | | ENDIF | | |
| 0004 | | BRANCH | LABEL4 | |
| | * | | | |
| 0005 | LABEL2 | LABEL | | |
| 0005 | | MOVE | (LITERAL1,TO,DATA2) | ASSIGN VALUE |
| | * | | | |
| 0006 | LABEL3 | LABEL | | |
| 0006 | | MOVE | (LITERAL2,TO,DATA3) | ASSIGN VALUE |
| 0007 | | CALL | SUB1 | CALL SUBROUTINE |
| 0008 | | BRANCH | LABEL5 | |
| | * | | | |
| 0009 | LABEL4 | LABEL | | |
| 0009 | | MOVE | (DATA2,TO,DATA1) | ASSIGN VALUE |
| | * | | | |
| 0010 | LABEL5 | LABEL | | |
| 0010 | | CASEFOR | DATA1 | TEST VALUES |
| | | CASE | LITERAL1,LABEL1 | |
| | | CASE | LITERAL2,LABEL2 | |
| | | CASE | LITERAL3,LABEL3 | |
| | | ENDCASE | | |
| | * | | | |
| 0011 | ERROR1 | LABEL | | ERROR RECOVERY POINT |
| | * | | | |
| 0011 | | FINISH | | END OF PROGRAM |

-continued

```
*
0012  SUB1   LABEL                          SUBROUTINE DEFINITION
0012         MOVE     (DATA2,TO,DATA1)      ASSIGN VALUE
0013         RETURN
0014         END                            END OF SOURCE
```

At the lowest level of granularity each statement of the procedural language will be converted into an object in the object oriented language. In this scenario, the objects are defined as individual programming language statements. An object will be created, for example, for the "move", "read", "goto" statements. Each of these statement types will have an abstract object for that statement type be created. At least one abstract object must exist for each statement in the analyzed program. If a particular statement, such as the "move" statement, appears in more than one form, for example with differing numbers of parameters, then subclasses of the abstract object will be created for each of the different formats of the instruction. Thus, a move instruction with two parameters will be created as a subclass of the move abstract class and a move instruction with three parameters will similarly be created as a subclass.

Figure 2:
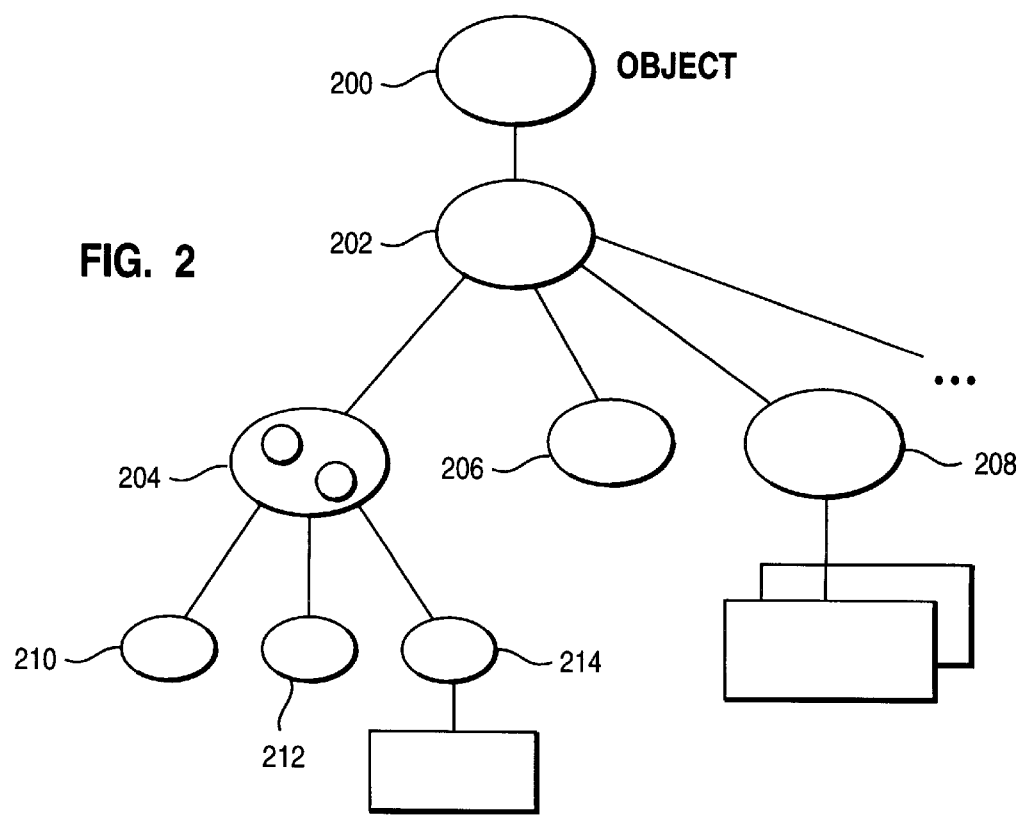
FIG. 2 is an object diagram illustrating an object framework according to the present invention.

Transformation of procedural code at this level of granularity causes each statement of procedural language code to be initialized as an instance of a statement class. This structure is illustrated graphically in FIG. 2. All objects in an object oriented system inherit properties from a root object 200. The statement object 202 defines the properties of all statements and serves as a base class from which all statements descend. Objects are created as subclasses of this object and can include an abstract class for a move object, a "move statement" object 204 a "goto" object 206 and other objects 208 if a particular implementation of the move object is desired specific classes can be created as shown at 210, 212 and 214. The first level of classes such as move 204 will generally be created as abstract classes which are never instantiated. However, if the parameters can be specified at this level a concrete class may be created at the first level 204. Similarly, any number of layers of classes may be added below the highest level move object. The number and hierarchical structure of the classes depends upon the complexities of the procedural language and the desire for transformation.

Each abstract class and concrete class is specified in the source code for the target language, for example the Java language. The class structure is provided as input into the transformation process. An example of the source code language statements defining a move class, a read class and related classes is provided as Example 2. The class statement declares the class name and the parameters for that statement. For example, in Example 2 the MoveStatement includes the parameter "next" and possibly other parameters. The "next" parameter is used to indicate which statement will be executed after the move statement. The executes) statement provides the method or functional logic for the particular statement. Within this method, the functional code for performing a move operation with the given parameters will be specified.

The transformation means 104 analyzes the source code 102 and locates each instance of a particular statement type. As the transformation means generates output code, it will create an instance of each particular type supplying the appropriate parameters as extracted from the original procedural code.

Figure 3:
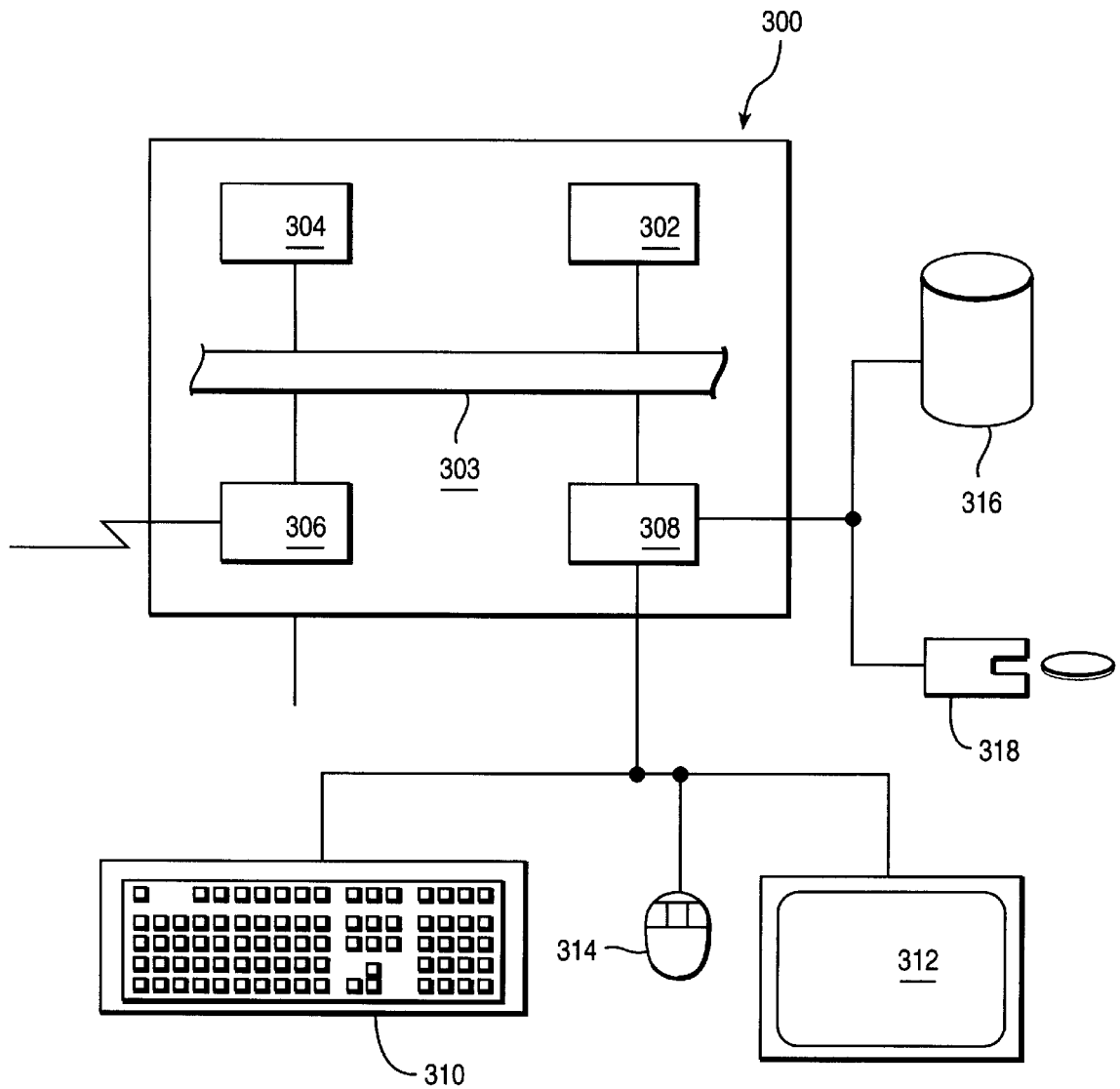
FIG. 3 is a block diagram of a computer according to the present invention.

The present invention is practiced using a computer system. In the preferred embodiment, the present invention is embodied as computer readable program logic on a computer readable medium. This readable program logic causes a computer system to perform the indicated functions. The particular computer system can be any type of computer system with a processor, storage and a control program. For example, preferred embodiment employs an IBM Personal Computer. FIG. 3 illustrates a typical structure for practicing the present invention. Computer system 300 includes a processor complex 302 having one or more computer processing units (CPUs), connected via system bus 303 to random access storage 304. Network controller 306 enables the system to communicate with other devices on a network. Input/output controller 308 controls interaction with user interface devices such as keyboard 310, display monitor 312, and pointing device 314. In addition, the Input/output controller manages access to permanent storage 316, and removable storage 318. Removable and permanent storage can include any devices such as magnetic, optical or other memory device.

At the lowest level of granularity each statement of procedural language program will be instantiated as a single object in the object oriented program. Execution of the resulting program requires that the execute( ) method for each of the instantiated objects be invoked. Thus, the resulting object oriented program will instantiate each of the statements and then execute each of the statements.

EXAMPLE 2

```
// declare statement types
abstract class Statement
{
    // execute statement, returning the next statement number to execute
    abstract int execute( ) throws StatementExecutionException;
}
class MoveStatement extends Statement
{
```

```
        int     next;                                  // next statement
        :
        public MoveStatement(int next, . . . other args . . . )    // constructor
        {
            this.next = next;
        }
        :
        public int execute( ) throws StatementExecutionException
        {
            :
            : statement specific behavior              // i.e, move data
            :
            return next;                               // sequential statement
        }
}
class ReadStatement extends Statement
{
        int     error;                                 // error target
        int     next;                                  // next statement
        :
        public ReadStatement(int next, int error, . . . other args . . . )    //
constructor
        {
            this.next = next; this.error = error;
        }
        :
        public int execute( ) throws StatementExecutionException
        {
            :
            : statement specific behavior
            :
            return (errorOccurred) ? error : next;     // select target
        }
}
class IfStatement extends Statement
{
        int     trueTarget;                            // true target
        int     falseTarget;                           // false target
        int     next;                                  // next statement (used to exit THEN
clause)
        :
        public IfStatement(int next, int trueTarget, int falseTarget, . . . other args . . . )
                // constructor
        {
            this.next = next; this.trueTarget = trueTarget; this.falseTarget = falseTarget;
        }
        :
        public int execute( ) throws StatementExecutionException
        {
            :
            : statement specific behavior              // i.e, test condition
            :
            return (perfomTrueClause) ? trueTarget : falseTarget;    // select trarget
        }
}
class BranchStatement extends Statement
{
        int     target;
        :
        public BranchStatement(int target)             // constructor
        {
            this.target = target;
        }
        :
        public int execute( ) throws StatementExecutionException
        {
            return target;                             // always takes the branch
        }
}
class CallStatement extends Statement
{
        int     next;                                  // next statement
        int     target;
        :
        public CallStatement(int next, int target)     // constructor
        {
            this.next = next; this.target = target;
        }
        :
        public int execute( ) throws StatementExecutionException
```

```
            {
                if (sp >= stack. length( )) throw new StatementExecutionException("Stack overflow");
                stack[sp++] = next;
                return target;                         // always takes the branch
            }
    }
    class ReturnStatement extends Statement
    {
        :
        public ReturnStatement( )                      // constructor
        {
        }
        :
        public int execute( ) throws StatementExecutionException
            {
                if(sp <= 0) throw new StatementExecutionException("Stack underflow");
                return stack[--sp];                    // always takes the branch
            }
    }
    class CaseForStatement extends Statement
    {
        int     next;                                  // next statement
        int[ ]  targets;                               // list of potential targets
        public CaseForStatement(int next, int[ ]targets, . . . other args . . . )   // constructor
        {
            this.next = next; this.targets = targets
        }
        :
        public int execute( ) throws StatementExecutionException
        {
            :
            : statement specific behavior             // i.e., determine which target
                                                      // instruction is desired
            :
            return (caseIndex >= 0) ? targets[caseIndex] : next;    // select target
        }
    }
    class FinishStatement extends Statement
    {
        :
        public FinishStatement( )                      // constructor
        {
        }
        :
        public int execute( ) throws StatementExecutionException
        {
            return -1;                                 // force end of execution
        }
    }
```

For each statement in the source, a corresponding statement object is be created. These objects are instances of the appropriate Statement subclass. For example, a MOVE (X,TO,Y) statement would cause the creation of a MoveStatement object. There is only one MoveStatement class, but it may have zero to many instances.

These statement instances would be collected in a linear structure (such as an Java array or Vector, an array will be used in all the examples.) Execution of the program would consist of sequencing through the structure, executing the object methods. Using Java syntax this control flow sequence could be defined as follows:

EXAMPLE 3

```
class Statement
{
    static final int   maxStackSize = ???;                          // some large number
    int[ ]             stack = new int[maxStackSize];               // call stack
    int                sp = 0;                                      // stack pointer
    :
    : other methods (see above)
    :
    // execute statements
    public static void flow(Statement[ ] statements)                // default start point
    {
        flow(statements, 0);
    }
    public static void flow(Statement[ ] statements, int start)    // explicit start point
```

-continued

```
{
    int     sc = start;                    // statement counter
    try
    {
        while(sc >= 0)                     // execution loop
            sc = statements[sc].execute( ); // perform next statement
    }
    catch(Exception e)
    {
        System.err.println("Exception during execution: " e);   // report error
    }
  }
}
```

Example 3 shows the class declaration and flow method for executing a resulting object oriented program. As illustrated in this example, statements are first created and then they are executed by invoking the flow( ) method. The flow( ) method causes the execute( ) method of each of the statement objects to be performed. This is repeated for each statement until all are complete.

In a first embodiment, statement objects are created as an indexed array in the order of the procedural code. This is shown above as the Statement array that contains each instance of statements generated. The object oriented result is then executed in order of the index causing each statement to be executed in the same order as it was in procedural code.

Example 4 illustrates the initialization of an indexed statement array for execution by the flow method. The statement array will still exist temporarily during the statement creation process or it may be located in the translation program. In an alternate method, instead of creating an array of statement index values the statements pass and return statement objects themselves instead of simply the index. Thus, instead of returning the index to the next statement to be executed, the flow routine returns the next object to be executed which can be then directly executed. Example 5 and 6 illustrate this approach.

EXAMPLE 4

```
import Statement;
class Program
{
    static final int    numberOfStatements = 14;
    static final int[ ] caseTargets_0010 = {0, 5, 6};          // targets for CASEFOR
statement 0010
    static final int[ ] literals_0010 = {{LITERAL1, 16}, {LITERAL2, 16}, LITERAL3,
16}};
        :
    // create statement array
    public Statement [ ] createStatementArray( )
    {
        Statement [ ] statements = new Statement [numberOfStatements];
        statements[0] = new MoveStatement(1, DATA1, 100, DATA2, 200);
        statements[1] = new ReadStatement(2, 11, DATA3, 300);
        statements[2] = new IfStatement(4, 10, 3, DATA2, 100, DATA3, 300);
        statements[3] = new MoveStatement(4, DATA2, 200, DATA3, 300);
        statements[4] = new BranchStatement(8);
        statements[5] = new MoveStatement(6, LITERAL1, 16, DATA2, 200);
        statements[6] = new CallStatement(7, 12);
        statements[7] = new MoveStatement(8, LITERAL2, 16, DATA3, 300);
        statements[8] = new BranchStatement(10);
        statements[9] = new MoveStatement(10, DATA2, 200, DATA1, 100);
        statements[10] = new CaseForStatement(11, caseTargets_0010, DATA1, 100,
literals_0010);
        statements[11] = new FinishStatement( );
        statements[12] = new MoveStatement(13, DATA2, 200, DATA3, 300);
        statements[13] = new ReturnStatement( );
        return statements;
    }
    static void main(String[ ] args)                  // main program
    {
        Statement.flow(createStatementArray( ));      run the program
    }
}
```

EXAMPLE 5

```
class IfStatement extends Statement
{
    Statement trueTarget;                    // true target
    Statement falseTarget;                   // false target
    Statement next;                          // next statement (used to exit THEN
clause)
        :
    public IfStatement( . . . other args . . . )    // constructor
    {
    }
        :
    public setTarget(statement next, Statement trueTarget, Statement falseTarget)
    {
        this.next = next; this.trueTarget = trueTarget; this.falseTarget = falseTarget;
    }
        :
    public Statement execute( ) throws StatementExecutionException
    {
            :
        : statement specific behavior         // i.e, test condition
            :
        return (perfomTrueClause) ? trueTarget : falseTarget;        // select trarget
    }
}
```

EXAMPLE 6

```
class Statement
{
        :
    : same as before
        :
    public static void flow(Statement start)
    {
        Statement   cs = start;                      // current statement
        try
        {
            while(cs != null)                        // execution loop
                cs = cs.execute( );                  // perform next statement
        }
        catch(Exception e)
        {
            System.err.println("Exception during execution; " e);    // report error
        }
    }
}
```

EXAMPLE 7

```
import Statement;
class Program
{
    static final int      numberOfStatements = 14,
    static final int[ ]   caseTargets__0010 = {0, 5, 6);          // targets for CASEFOR
statement 0010
    static final int[ ]   literals__0010 = {{LITERAL1, 16}, {LITERAL2, 16}, {LITERAL3,
16}};
        :
    // create statement
    public Statement createStatements( )              // default start
    {
        return createStatements(0)
    }
    // create statement
    public Statement createStatements(int start)      // explicit start
    {
        Statement[ ] statements = new Statement [numberOfStatements];
        // create each statement, supply execution parameters
        statements[0] = new MoveStatement(DATA1, 100, DATA2, 200);
        statements[1] = new ReadStatement(DATA3, 300);
```

```
            statements[2] = new IfStatement(DATA2, 100, DATA3, 300)
            statements[3] = new MoveStatement(DATA2, 200, DATA3, 300);
            statements[4] = new BranchStatement( );
            statements[5] = new MoveStatement(LITERAL1, 16, DATA2, 200);
            statements[6] = new CallStatement( );
            statements[7] = new MoveStatement(LITERAL2, 16, DATA3, 300);
            statements[8] = new BranchStatement( );
            statements[9] = new MoveStatement(DATA2, 200, DATA1, 100);
            statements[10] = new CaseForStatement(DATA1, 100, literals__0010);
            statements[11] = new FinishStatement( );
            statements[12] = new MoveStatement(DATA2, 200, DATA3, 300);
            statements[13] = new ReturnStatement( );
            // link statements, supply next statements
            statements[0].setTarget(statements[1]);
            statements[1].setTarget(statements[2], statements[11]);
            statements[2].setTarget(statements[4], statements[9], statements[3]);
            statements[3].setTarget(statements[4]);
            statements[4].setTarget(statements[8]);
            statements[5].setTarget(statements[6]);
            statements[6].setTarget(statements[7], statements[12]);
            statements[7].setTarget(statements[8]);
            statements[8].setTarget(statements[10]);
            statements[9].setTarget(statements[10]);
            statements[10].setTarget(0, statements[11]);           // add fixed
target
            for(int i = 0; i < caseTargets__0010.length; i++)      // add
variable targets
                    statements[10].setTarget(i + 1, caseTargets__0009[i]);
            statements[12].setTarget(statements[13]);
            return statements[start];
        }
        static void  main(String[ ] args)             // main program
        {
            Statement.flow(createStatements(0));              run the program
        }
}
```

Example 7 shows the output code of the alternate embodiment that does not use the index of the next statement to control flow. Instead, each object passes back the next object itself rather than the index reference which reduces the storage required to store the index table and may increase performance. The statements array is discarded after the graph of statements is created and the starting statement is returned. The ".setTarget:" method is different for each statement type and includes the computer program logic to determine the next object method the system needs to invoke. Some instructions have no target (e.g. RETURN, FINISH) so they do not provide a setTarget method In the preferred emnbodiment, the loading or creation of objects is performed when the object oriented program is initially loaded. System performance may be enhanced by delaying the loading of a particular object until that object is required. For example, if the memory of a computer system is constrained, attempting to load all of the objects will result in significant amounts of swapping during the execution of the program which will reduce performance. If instead, objects are loaded only as required, overall throughput for the system will be improved.

A method such as "load:" is provided which loads a statement object. The loop shown in Example 8 provides this dynamic loading. The routine first tests to determine whether the required statement object is loaded (statements [sc]= null) and, if not, invokes the loader to load the statement. Finally, the statement is executed.

EXAMPLE 8

```
while (sc > 0) {
    if(statements[sc] == null)
        statements[sc] = Statement.load(sc);
    sc = statements[sc].execute( );
        }
```

The dynamic loading of statements invokes the loader only when a statement is first executed. The routine ensures that the loader is invoked only upon the first execution and does not need to be invoked on subsequent executions of the same statement. Because the loader is invoked only when a statement is used this alternative embodiment can significantly improve performance if major sections of the statement array are never used during a particular execution. This may occur, for example, if logic is included for a number of alternate branches of the logic which in most cases are never used. The memory use is also reduced since the unused statements are never loaded.

This optimization can be further improved by eliminating the need to test whether or not the required statement object is loaded prior to executing each statement. This is accomplished by creating a "StatementLoader" for each statement that causes that statement to be loaded and the loader routine removed from the logic. Each statement is originally set up to invoke the loader by creating a surrogate StatementLoader object to load the associated class and create the desired instance when the statement it represents is first executed. Once the statement is loaded the surrogate is removed eliminating any surrogate or test overhead on subsequent execution. If a statement object is discarded, for example to reduce storage use, the surrogate Statement- Loader can be reinserted into the array to repeat the process. The StatementLoader surrogate instances should, in most cases, be smaller than the specific statement instances. This embodiment results in an execution loop as shown in Example 9A based on a statement array shown in Example 9B.

EXAMPLE 9A

```
while(sc >0)
    SC = statements[sc].execute( );
```

EXAMPLE 9B

```
statements[0] = new StatementLoader(statements, 0);
    :
statements[m] = new XxxxStatement( . . . );   // ie mix and match real statements too
    :
statements[n] = new StatementLoader(statements, n);
```

Example 9B illustrates statement[0] as invoking a statement loader surrogate. Mixed in the array is, for example, statement[m] which is illustrated as XxxxStatement which could be, for example, a MoveStatement. The statement array thus would contain a mixture of real and surrogate statements. As execution proceeds the surrogates will tend to be replaced by real statement objects.

The first embodiment as a whole illustrates the use of individual statement objects for each statement in a translated source code program. The flow of control is used by a statement counter which indexes a linear sequence of statement objects. Each object knows the set of indexes of its statically subsequent statements. Dynamically, at run time, each statement selects in the appropriate subsequent statement index and returns that value. Unconditional statements such as move or branch have only one possible subsequent statement while conditional statements such as IF and CASEFOR have multiple and potentially a variable number of subsequent statements. Execution continues as long as a statement returns a valid subsequent statement index.

A second embodiment of the present invention transforms each paragraph of a source code program into an executable object in the target object oriented program. A paragraph is defined as the executable statements between two sequential labels. A paragraph may contain 0 or more statements. In the Example 1 paragraphs are created for the items of Label1, Label2, Label3, Label4, Label5, Error1, and Sub1. Each class would be a subclass of an appropriate, typically abstract, superclass named for example "paragraph". Each class will have at most one instance (each class is a singleton.)

One problem that can arise with the paragraph by paragraph translation approach is the ability of a paragraph to have more than one exit or entry point. For example, a CALL statement leaves the paragraph and the matching RETURN statement reenters the paragraph at the -statement after the invoking CALL statement instead of at the start of the paragraph. This problem can be solved in two ways. First, each paragraph that allows interior entry can be provided with its own switch statement to select the interior restart point. Each paragraph selector then becomes an ordered pair containing (<paragraph selector, entry selector>). This causes the dispatcher to determine which paragraph to execute and then use the entry index to cause the switch statement to select the interior restart point. In a Java language implementation this technique is restricted by the Java "value only" parameter types which effectively eliminate the ability to return more than one result from a method. The paired return value can be expressed as a single encoded integer or long value combining both a paragraph index and an entry index. Thus, if a 32 bit integer is used, the combination can be expressed as "paragraph index<<16+ entry index." If the expected maximum value is a paragraph and entry index are large a long 64 bit integer can be used. Any code that specifies a branch must specify a target pair. This double dispatching approach is illustrated in Example 10.

EXAMPLE 10

```
// declare statement types
abstract class Paragraph
{
    static final int    maxStackSize = ???;              // some large number
    int[ ]              stack = new int[maxStackSize];   // call stack
    int                 sp = 0;                          // stack pointer
    // execute statement, returning the next paragraph number to execute
    abstract int execute(int subpart) throws StatementExecutionException;
    // execute paragraphs
    public static void flow(Paragraph[ ] paragraphs)                    // default start point
    {
        flow(paragraphs, 0 << 16 + 0);
    }
    public static void flow(Paragraph[ ] paragraphs, int start)         // explicit start
point
    {
        int     pc = start;         // paragraph counter
        int     ps, es;             // paragraph & entry selectors
        try
        {
            for (;;)                                     // execution loop
            {
                ps = pc >> 16; es = pc & 0xFFFF;
                if(ps < 0) break;
                pc = paragraphs[ps].execute(es);         // perform next paragraphs
            }
        }
```

```
            catch(Exception e)
            {
                System.err.println("Exception during execution: " e);    // report error
            }
        }
    }
}
class Label1Paragraph extends Paragraph
{
    public int execute(int subpart) throws StatementExecutionException
    {
        move(DATA1, 100, DATA2, 200);
        if(!read(DATA3, 300)) return 5 << 16 + 0;                    // ERROR1
        if(testEQ(DATA1, 100, DATA3, 300)) return 4 << 16 +0;        // LABEL5
        move(DATA2, 200, DATA3, 300);
        return 3 << 16 + 0;                                          // LABEL4
    }
}
class Label2Paragraph extends Paragraph
{
    public int execute(int support) throws StatementExecutionException
    {
        move(LITERAL1, 16, DATA2, 200);
        return 2 << 16 + 0                                           // LABEL3
    }
}
class Label3Paragraph extends Paragaph
{
    public int execute(int subpart) throws StatementExecutionException
    {
        switch(subpart)
        {
            default:
                throw new StatementExecutionException("Invalid subpart index");
            case 0:
                move(LITERAL2, 16, DATA3, 300);
                if(sp >= stack.length( )) throw new StatementExecutionException("Call stack overflow");
                stack[sp++] = 2 << 16 + 1;          // LABEL3 + return point
                return 6 << 16 + 0;                 // SUB1
            case 1:
                return 4 << 16 + 0;                 // LABEL5
        }
    }
}
class Label4Paragraph extends Paragaph
{
    public int execute(int subpart) throws StatementExecutionException
    {
        move(DATA2, 200, DATA3, 300);
        return 4 << 16 + 0;                                          // LABEL5
    }
}
class Label5Paragraph extends Paragaph
{
    public int execute(int subpart) throws StatementExecutionException
    {
        if(testEQ(DATA1, 100, LITERAL1, 16)) return    0 << 16 + 0;  // LABEL1
        if(testEQ(DATA1, 100, LITERAL2, 16)) return    1 << 16 + 0;  // LABEL2
        if(testEQ(DATA1, 100, LITERAL3, 16)) return    2 << 16 + 0;  // LABEL3
        return                                         5 << 16 + 0;  // ERROR1
    }
}
class Error1Paragraph extends Paragaph
{
    public int execute(int subpart) throws StatementExecutionException
    {
        return -1 << 16 + 0;                        // cause execution end
    }
}
class Sub1Paragraph extends Paragaph
{
    public int execute(int subpart) throws StatementExecutionException
    {
        move(DATA2, 200, DATA1, 100);
        if(sp <= 0) throw new StatementExecutionException("Call stack underflow");
        return stack[--sp];                         // cause a return
    }
}
```

In this embodiment each paragraph performs a specific behavior and returns a selected next paragraph index pair. To create the paragraph objects, the translated program reads the original source code and generates a new source code program to create the paragraph array. The initialization code, in Java syntax for the example program is shown in FIG. 11.

EXAMPLE 11

```
import Statement;
class Program
{
    static final int         numberOfParagraphs = 7;
    :
    // create statement array
    public Paragraph [ ] createParagraphArray( )
    {
        Paragraph[ ] paragraphs = new Paragraph[numberOfParagraphs];
        paragraphs[0] = new Label1Paragraph( );
        paragraphs[1] = new Label2Paragraph( );
        paragraphs[2] = new Label3Paragraph( );
        paragraphs[4] = new Label4Paragraph( );
        paragraphs[5] = new Label5Paragraph( );
        paragraphs[6] = new Error1Paragraph( );
        paragraphs[7] = new Sub1Paragraph( );
        return paragraphs;
    }
    static void      main(String[ ] args)         // main program
    {
        Paragraph.flow(createParagraphArray( ));   // run the program
    }
}
```

This example creates the paragraph array with new objects being created for each paragraph. Finally the program is run using the paragraph.flow method invocation.

The second approach to dealing with interior entry into a paragraph is to cause the code to be divided into paragraphs for each internal entry point. Thus, a paragraph with an internal entry point would be divided into at least two internal or virtual paragraphs. These internal paragraphs would be assigned a label and would be handled in the same way paragraphs are handled. For the sample code example shown in Example 1, a virtual paragraph would be started between statements 0007 and 0008 be given the name, for example, Virtual1. This would result in the code shown in Example 12.

EXAMPLE 12

```
// declare statement types
abstract class Paragraph
{
    static final int    maxStackSize = ???;                      // some large number
    int[ ]              stack = new int[maxStackSize]             // call stack
    int                 sp = 0;                                   // stack pointer
    // execute statement, returning the next paragraph number to execute
    abstract int execute( ) throws StatementExecutionException;
    // execute paragraphs
    public static void flow(Paragraph[ ] paragraphs)              // default start point
    {
        flow(paragraphs, 0);
    }
    public static void flow(Paragraph[ ] paragraphs, int start)   // explicit start
point
    {
        int    pc = start;                           // paragraph counter
        try
        {
            while(pc >= 0)                           // execution loop
                pc = paragraphs[pc].execute( );      // perform next paragraphs
        }
        catch(Exception e)
        {
            System.err.println("Exception during execution: " e);   // report error
        }
    }
}
class Label1Paragraph extends Paragaph
```

-continued

```
{
    public int execute( ) throws StatementExecutionException
    {
        move(DATA1, 100, DATA2, 200);
        if(!read(DATA3, 300)) return 6;                    // ERROR1
        if(testEQ(DATA1, 100, DATA3, 300)) return 5;       // LABEL5
        move(DATA2, 200, DATA3, 300);
        return 3;                                          // LABEL4
    }
}
class Label2Paragraph extends Paragaph
{
    public int execute( ) throws StatementExecutionException
    {
        move(LITERAL1, 16, DATA2, 200);
        return 2;                                          // LABEL3
    }
}
class Label3Paragraph extends Paragaph
{
    public int execute( ) throws StatementExecutionException
    {
        move(LITERAL2, 16, DATA3, 300);
        if(sp >= stack.length( )) throw new StatementExecutionException("Call stack overflow");
        stack[sp++] = 3;                                   // VIRTUAL1 (return point)
        return 7;                                          // SUB1
    }
}
class Virtual1Paragraph extends Paragaph
{
    public int execute( ) throws StatementExecutionException
    {
        return 5;                                          // LABEL5
    }
}
class Label4Paragraph extends Paragaph
{
    public int execute( ) throws StatementExecutionException
    {
        move(DATA2, 200, DATA3, 300);
        return 5;                                          // LABEL5
    }
}
class Label5Paragraph extends Paragaph
{
    public int execute( ) throws StatementExecutionException
    {
        if(testEQ(DATA1, 100, LITERAL1, 16)) return    0;   // LABEL1
        if(testEQ(DATA1, 100, LITERAL2, 16)) return    1;   // LABEL2
        if(testEQ(DATA1, 100, LITERAL3, 16)) return    2;   // LABEL3
        return                                         6;   // ERROR1
    }
}
class Error1Paragraph extends Paragaph
{
    public int execute( ) throws StatementExecutionException
    {
        return -1;                                         // cause execution end
    }
}
class Sub1Paragraph extends Paragaph
{
    public int execute( ) throws StatementExecutionException
    {
        move(DATA2, 200, DATA1, 100);
        if(sp <= 0) throw new StatementExecutionException("Call stack underflow");
        return stack[--sp];                                // cause a return
    }
}
```

As in the first embodiment, each paragraph performs its specified behavior and returns the next paragraph index. The translated program would read the original source program and create a new source program that creates a paragraph array and executes the code. The initialization sequence and execution is shown in Example 13.

EXAMPLE 13

```
import Statement;
class Program
{
```

-continued

```
static final int        numberOfParagraphs = 8;
:
// create statement array
public Paragraph[ ] createParagraphArray( )
{
    Paragraph[ ] paragraphs = new Paragraph[numberOfParagraphs];
    paragraphs[0] = new Label1Paragraph( );
    paragraphs[1] = new Label2Paragraph( );
    paragraphs[2] = new Label3Paragraph( );
    paragraphs[3] = new Virtual1Paragraph( );
    paragraphs[4] = new Label4Paragraph( );
    paragraphs[5] = new Label5Paragraph( );
    paragraphs[6] = new Error1Paragraph( );
    paragraphs[7] = new Sub1Paragraph( );
    return paragraphs;
}
static void     main(string[ ] args)         // main program
{
    Paragraph.flow(createParagraphArray( ));  // run the program
}
}
```

In each of the above methods shown in Examples 10 and 12 the processing logic is embedded in the execute( ) method for each paragraph. Thus, in Example 12 the class Label I Paragraph includes an execute method that has the Move, If, and ReturnStatements for the logic within that paragraph of the source code. Each of the original source code statements is transformed into an appropriate language statement, for example Java language, and embedded in the new object oriented program.

As in the first statement-by-statement embodiment, the paragraph-by-paragraph objects can be optimized through various techniques. First, the paragraph objects can be optimized by passing and returning the paragraph objects themselves instead of an index to the paragraph array. This eliminates the need to keep the paragraph array in storage as each paragraph knows its possible successors. This saves space for the array and time required for the array index operation at the cost of the more complex initialization sequence. The paragraph array will still exist temporarily during paragraph creation process or it may be located in the translation program.

As with the statement by statement method, dynamic object loading can be used to avoid loading all paragraphs at once. ParagraphLoader can be created as a surrogate object which loads and executes the paragraph object the first time.

The paragraph by paragraph translation supports a middle level of granularity of procedural source program translation. The program is split into paragraphs that are executed to perform the required logic.

Paragraphs with multiple entry points are split into virtual paragraphs or double dispatching is used to select internal entry points. The flow is controlled by an index value or value pair that is set by each paragraph and used in a subsequent iteration of the execution loop.

A third embodiment at the highest level of granularity is the creation of a single object for the entire program to be translated. This technique creates a single method to contain all of the control flow of the procedural source program. No new classes or instances are required as they are in the first two embodiments. The translated code in this embodiment most closely resembles the original code source.

A target program written in an object oriented language such as Java will typically not have a "goto" statement. A different branching method must be implemented to perform the logic found in the procedural goto statement. Most modern programming languages, including Java language, have an indexed branch statement, for example a SWITCH or CASE statement. These statements cause a particular subset of the code to be executed based upon the index value into the index branch statement. In applying this technique within the present invention, each source statement in the procedural program to be translated is assigned a unique index. The index branch statement can be used to control the flow between these statements. The Example1 source program could be automatically transformed using this technique as shown in Example 14.

EXAMPLE 14

```
class Program
{
    static final int          maxStackSize = ???;                    // some large number
    public void flow( )                                              // default start point
    {
        flow(0);
    }
    public void flow(int start)                                      // explicit start point
    {
        int              sc = start;                                 // statement counter
        int[ ]           stack = new int[maxStackSize];              // call stack
        int              sp = 0;                                     // stack pointer
        try
        {
            while(sc >= 0)                                           // execution loop
                switch(sc)
                {
                    default:
                        throw new StatementExecutionException("Invalid statement counter " + sc);
                    case LABEL1:
                    case 0:
                        move(DATA1, 100, DATA2, 200);
                        sc++;                                        // advance to the next
                                    statement
                        break;                                       // iterate the loop
                    case 1:
                        if(read(DATA3, 300))   sc++;
                        else                   sc = 11;              // ERROR1
                        break;                                       // iterate the loop
```

-continued

```
                    case 2:
                        if(testEQ(DATA1, 100, DATA3, 300))    sc = 10;   // LABEL5
                        else                                   sc = 3;    // set to next
                        break;                                            // iterate the loop
                    case 3:
                        move(DATA2, 200, DATA3, 300);
                        sc = 4                                            // set to next
                        break;                                            // iterate the loop
                    case 4:
                        sc = 9;                                           // LABEL4
                        break;                                            // iterate the loop
                    case LABEL2:
                    case 5:
                        move(LITERAL1, 16, DATA2, 200);
                        sc++;                                             // advance to the next
statement
                        break;                                            // iterate the loop
                    case LABEL3:
                    case 6:
                        move(LITERAL2, 16, DATA3, 300);
                        sc++;                                             // advance to the next
statement
                        break;                                            // iterate the loop
                    case 7:
                        if(sp >= stack.length( )) throw new StatementExecutionException("Call stack
overflow")
                        stack[sp++] = 8;                                  // remember return point
                        sc = 12;
                        break;                                            // iterate the loop
                    case 8:
                        sc = 10;                                          // LABEL5
                        break;                                            // iterate the loop
                    case LABEL4:
                    case 9:
                        move(DATA2, 200, DATA1, 100);
                        sc++;                                             // advance to the next
statement
                        break;                                            // iterate the loop
                    case LABEL5:
                    case 10:
                        if (testEQ(DATA1, 100, LITERAL1, 16))    sc = 0;   // LABEL1
                        else if(testEQ(DATA1, 100, LITERAL2, 16)) sc = 5;  // LABEL2
                        else if(testEQ(DATA1, 100, LITERAL3, 16)) sc = 6;  // LABEL3
                        else                                      sc = 11; // ERROR1
                        break;                                             // iterate the loop
                    case ERROR1:
                    case 11:
                        sc = -1;                                          // end execution
                        break;                                            // iterate the loop
                    case SUB1:
                    case 12:
                        move(DATA1, 100, DATA2, 200);
                        sc++;                                             // advance to the next
statement
                        break;                                            // iterate the loop
                    case 13:
                        if(sp <= 0) throw new StatementExecutionException("Call stack underflow");
                        sc = stack[--sp];                                 // cause a return
                        break;                                            // iterate the loop
                }
            }
            catch(Exception e)
            {
                System.err.println("Exception during execution: " e);     // report error
            }
        }
    }
}
```

Looking at Example 14, the first move statement is assigned to case zero(0) and is executed when the statement index is zero. The execution of a particular statement causes the statement index (SC) to be incremented to cause execution of the next statement. Thus, the execution logic repeatedly loops through the switch statement causing execution and incrementing of the statement counter. Execution continues until an invalid statement index is selected.

The code of Example 14 can be optimized to reduce processing time. It is not necessary to execute the switch statement and repeat the loop just to select the next statement in each case. This approach is illustrated in Example 15.

EXAMPLE 15

```
class Program
{
    static final int          maxStackSize = ???;                    // some large number
    public void flow( )                                              // default start point
    {
        flow(0);
    }
    public void flow(int start)                                      // explicit start point
    {
        int               sc = start;                                // statement counter
        int[ ]            stack = new int[maxStackSize];             // call stack
        int               sp = 0;                                    // stack pointer
        try
        {
            while(sc >= 0)                                           // execution loop
                switch (sc)
                {
                    default:
                        throw new StatementExecutionException("Invalid statement counter " + sc);
                    case LABEL1:
                    case 0:
                        move(DATA1, 100, DATA2, 200);
                    case 1:
                        if(!read(DATA3, 300)) { sc = 11; break; }              // ERROR1
                    case 2:
                        if(!testEQ(DATA1, 100, DATA3, 300)) { sc = 10; break; }    // LABEL5
                    case 3:
                        move(DATA2, 200, DATA3, 300);
                    case 4:
                        sc = 9;                                              // LABEL4
                        break;                                      // iterate the loop
                    case LABEL2:
                    case 5:
                        move(LITERAL1, 16, DATA2, 200);
                    case LABEL3:
                    case 6:
                        move(LITERAL2, 16, DATA3, 300);
                    case 7:
                        if(sp >= stack.length( )) throw new StatementExecutionException("Call stack overflow");
                        stack[sp++] = 8;                            // remember return point
                        sc = 12;
                        break;                                      // iterate the loop
                    case 8:
                        sc = 10;                                             // LABEL5
                        break;                                      // iterate the loop
                    case LABEL4:
                    case 9:
                        move(DATA2, 200, DATA1, 100);
                    case LABEL5:
                    case 10:
                        if(testEQ(DATA1, 100, LITERAL1, 16)) { sc = 0; break; }   // LABEL1
                        if(testEQ(DATA1, 100, LITERAL2, 16)) { sc = 5; break; }   // LABEL2
                        if(testEQ(DATA1, 100, LITERAL3, 16)) { sc = 6; break; }   // LABEL3
                    case ERROR1:
                    case 11:
                        sc = -1;                                    // end execution
                        break;                                      // iterate the loop
                    case SUB1:
                    case 12:
                        move(DATA1, 100, DATA2, 200);
                    case 13:
                        if(sp <= 0) throw new StatementExecutionException("Call stack underflow");
                        sc = stack[--sp];                           // cause a return
                        break;                                      // iterate the loop
                }
        }
        catch(Exception e)
        {
           System.err.println("Exception during execution: "+e);             // report error
        }
    }
}
```

This example removes many of the iterations of the "while" loop. In cases where no branching is possible the sequential statements are included within each case block. This approach improves performance and reduces size of the program.

Transforming a procedural source code into a single program object has the disadvantage of creating a very large translated program. Placing all of this code in a single method can result in a very large method for the object. Many languages, and in particular Java, have an upper bound on the size of a method. This can lead to situations in which the program to be translated cannot be translated into a single new program object. The solution to this problem is to divide the flow method into one or more logical blocks.

The logical points of division can be based on: an arbitrary source file line count so that every so many lines are grouped into a single executable method; or an arbitrary label count grouping a set number of labels into a single executable method. Splitting on source file line count becomes the first embodiment if the line count is set to one. Splitting into a number of labels becomes the second embodiment if split at every single label. A third approach would be to split the program into executable methods based upon the physically grouped set of source program statements. For example, a particular program may consist of several source files that are logically concatenated together. Each division point will be at the separate source code file level. An example of this is shown in Example 16.

EXAMPLE 16

DATA
FLOW1
FLOW2

The above file consists of a control file that names of other source files to be processed. The associated source is divided as follows:

EXAMPLE 16 CONTINUED

```
File DATA:
Loc    Source
               START                                      START OF PROGRAM
               DATA      DATA1,LENGTH=100                 DATA AREA DECLARATIONS
               DATA      DATA2 , LENGTH=200
               DATA      DATA3, LENGTH=300
               LITERAL LITERAL1,'LITERAL STRING 1'        CONSTANT DECLARATIONS
               LITERAL LITERAL2,'LITERAL STRING 2'
               LITERAL LITERAL3,'LITERAL STRING 3'
       * other declarative statements.
       *
File FLOW1:
       *
       * control flow begins
       *
0000   LABEL1  LABEL
0000           MOVE      (DATA1,TO,DATA2)                 ASSIGN VALUE
0001           READ      DATA3,ERROR1                     GET VALUE
0002           IF        (DATA1,EQ,DATA3)                 TEST VALUE
               THEN      LABEL5
               ELSE
0003           MOVE      (DATA2,TO,DATA3)                 ASSIGN VALUE
               ENDIF
0004           BRANCH    LABEL4
       *
0005   LABEL2  LABEL
0005           MOVE      (LITERAL1,TO,DATA2)              ASSIGN VALUE
       *
0006   LABEL3  LABEL
0006           MOVE      (LITERAL2,TO,DATA3)              ASSIGN VALUE
0007           CALL      SUB1                             CALL SUBROUTINE
0008           BRANCH    LABEL5
       *
0009   LABEL4  LABEL
0009           MOVE      (DATA2,TO,DATA1)                 ASSIGN VALUE
       *
0010   LABEL5  LABEL
0010           CASEFOR DATA1                              TEST VALUES
               CASE      LITERAL1,LABEL1
               CASE      LITERAL2,LABEL2
               CASE      LITERAL3,LABEL3
               ENDCASE
File FLOW2:
       *
       * control flow continues
       *
0011   ERROR1  LABEL                                      ERROR RECOVERY POINT
       *
0011           FINISH                                     END OF PROGRAM
       *
0012   SUB1    LABEL                                      SUBROUTINE DEFINITION
0012           MOVE      (DATA2,TO,DATA1)                 ASSIGN VALUE
0013           RETURN
0014           END                                        END OF SOURCE
```

Using a technique similar to the double dispatching approach, each separate flow and statement within the flow is given an index. The flow is selected and then the statement in the flow is selected.

The generated flow from file FLOW1 and FLOW2 can be separated as shown in the following high level flow:

EXAMPLE 17

```
class Program
{
    static final int           maxStackSize = ???;                    // some large number
    public void flow( )                                               // default start point
    {
        flow(0 << 16 + 0);
    }
    public void flow(int start)                                       // explicit start point
    {
        int                    fc = start >> 16;                      // flow counter
        int[ ]                 stack = new int[maxStackSize];         // call stack
        int                    sp = 0;                                // stack pointer
        try
        {
            int                next;
            while((fc > 16) >= 0)                                     // execution loop
                {
                    switch(fc >> 16)
                    {
                        default:
                            throw new StatementExecutionException("Invalid flow counter " + fc);
                        case 0 :                                      // for file FLOW1
                            fc = flow0(fc);
                            break;
                        case 1 :                                      // for file FLOW2
                            fc = flow1(fc);
                            break;
                    }
                }
        }
        catch (Exception e)
        {
            System.err.println("Exception during execution: " e);     // report error
        }
    }
Flow section for file FLOW1:
    public int flow0(int start)                                       // explicit start point
    {
        int                    fc = start >> 16;                      // flow counter
        int                    sc = start & 0xFFFF;                   // statement counter
        try
        {
            while(fc == 0)                                            // execution loop
                switch(sc)
                {
                    default:
                        throw new StatementExecutionException("Invalid statement counter " + sc);
                    case LABEL1:
                    case 0:
                        move(DATA1, 100, DATA2, 200);
                        sc++;                                         // advance to the next
statement
                        break;                                        // iterate the loop
                    case 1:
                        if(read(DATA3, 300)) sc++;
                        else           { fc = 1; sc = 11; }           // ERROR1
                        break;                                        // iterate the loop
                    case 2:
                        if(testEQ(DATA1, 100, DATA3, 300))    sc = 10;  // LABEL5
                        else                                  sc = 3;   // set to next
                        break;                                        // iterate the loop
                    case 3:
                        move(DATA2, 200, DATA3, 300);
                        sc = 4
                        break;                                        // set to next
                                                                      // iterate the loop
                    case 4:
                        sc = 9;                                       // LABEL4
                        break;                                        // iterate the loop
                    case LABEL2:
                    case 5:
                        move(LITERAL1, 16, DATA2, 200);
                        sc++;                                         // advance to the next
statement
                        break;                                        // iterate the loop
```

```
                            case LABEL3:
                        case 6:
                            move(LITERAL2, 16, DATA3, 300);
                            sc++;                                       // advance to the next
statement
                            break;                                      // iterate the loop
                        case 7:
                            if(sp >= stack.length( )) throw new StatementExecutionException("Call stack
overflow")
                            stack[sp++] = 0 << 16 + 8;                  // remember return point
                            { fc = 1; sc = 12; }                        // SUB1
                            break;                                      // iterate the loop
                        case 8:
                            sc = 10;                                    // LABEL5
                            break;                                      // iterate the loop
                        case LABEL4:
                        case 9:
                            move(DATA2, 200, DATA1, 100);
                            sc++;                                       // advance to the next
statement
                            break;                                      // iterate the loop
                        case LABEL5:
                        case 10:
                            if (testEQ(DATA1, 100, LITERAL1, 16))       sc = 0;    // LABEL1
                            else if(testEQ(DATA1, 100, LITERAL2, 16))   sc = 5     // LABEL2
                            else if(testEQ(DATA1, 100, LITERAL3, 16))   sc = 6;    // LABEL3
                            else                                        { fc = 1; sc = 11; }   // ERROR1
                            break;                                      // iterate the loop
                    }
            }
            catch(Exception e)
            {
                System.err.println("Exception during execution: " e) ;                   // report error
            }
            return fc << 16 + sc;
}
```

The fc variable is only seat on statements that leave the flow.

```
Flow section for file FLOW2:
    public int flow1(int start)                                         // explicit start point
    {
        int             fc = start >> 16;                               // flow counter
        int             sc = start & 0xFFFF;                            // statement counter
        try
        {
            while(fc == 1)                                              // execution loop
                switch(sc)
                {
                    default:
                        throw new StatementExecutionException("Invalid statement counter " + sc);
                    case ERROR1:
                    case 11:
                        fc = -1;                                        // end execution
                        break;                                          // iterate the loop
                    case SUB1:
                    case 12:
                        move(DATA1, 100, DATA2, 200);
                        sc++;                                           advance to the next
statement
                        break;                                          // iterate the loop
                    case 13:
                        {
                        if(sp <= 0) throw new StatementExecutionException("Call stack
underflow");
                        int t = stack[--sp];                            // cause a return
                        fc = t >> 16; sc = t & 0xFFFF;
                        }
                        break;                                          // iterate the loop
                }
        }
        catch (Exception e)
        {
            System.err.println("Exception during execution: " e);       // report error
        }
        return fc << 16 + sc;
```

```
      }
}
```

Figure 4:
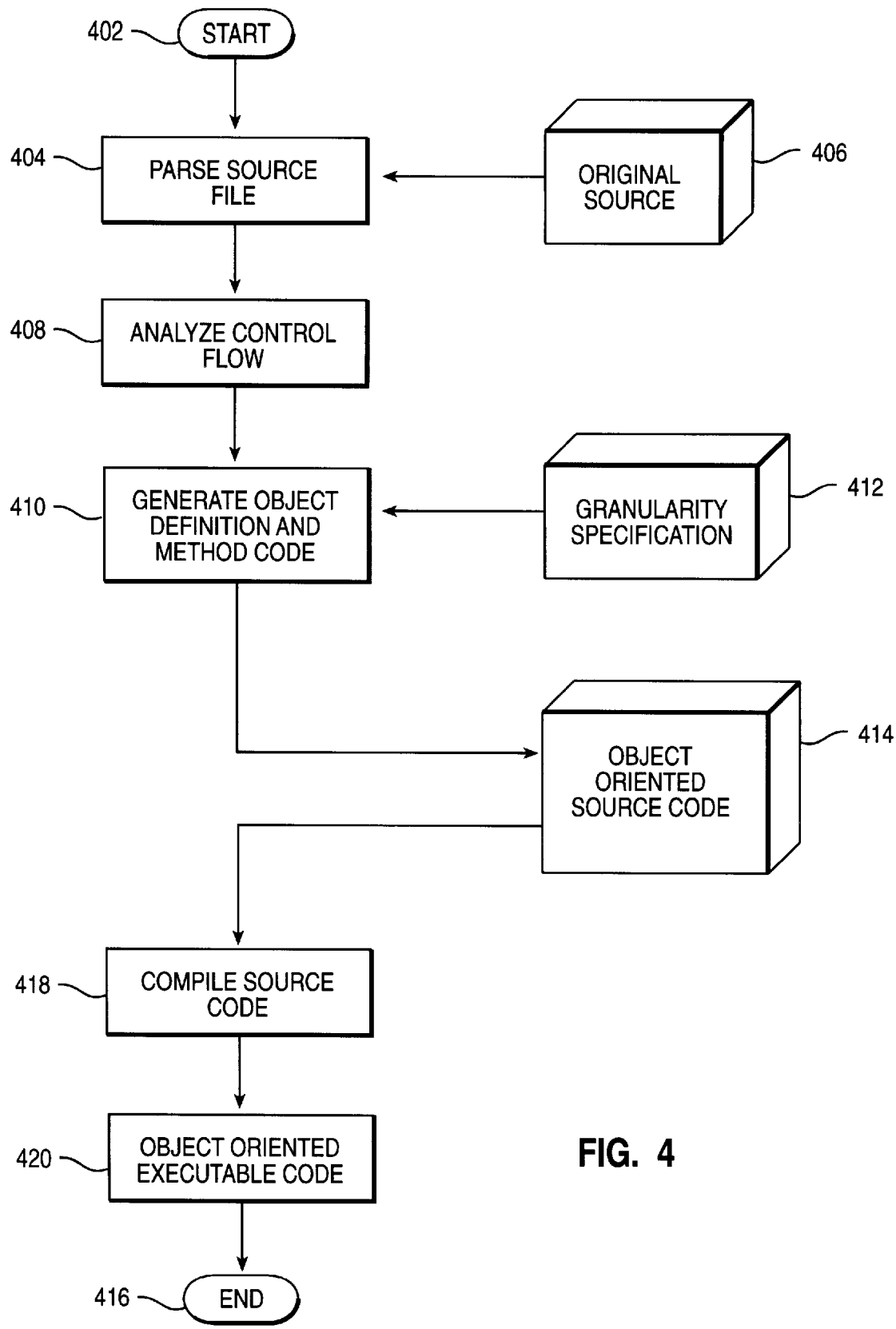
FIG. 4 is a flow diagram illustrating the operating of the present invention.

The general process for automatically transforming goto based source code into goto-less object oriented code is shown in FIG. 4. The process starts 402 and moves into parsing 404 of the original source 406. The parsing process read in the original source code and determines its components. The system next analyzes the control flow and content of that source 408. Finally, object oriented code is generated based on a selected level of granularity 412. The granularity specification 412 constitutes an object oriented framework or structure for the resulting object oriented environment. Code generator 410 outputs object oriented source code statements 414 that define objects and object methods and also the initialization and execution logic that instantiates and runs the resulting program. Object oriented source code statements 414 are compiled 418 resulting in object oriented executable code 420. The process then ends 416.

Figure 5:
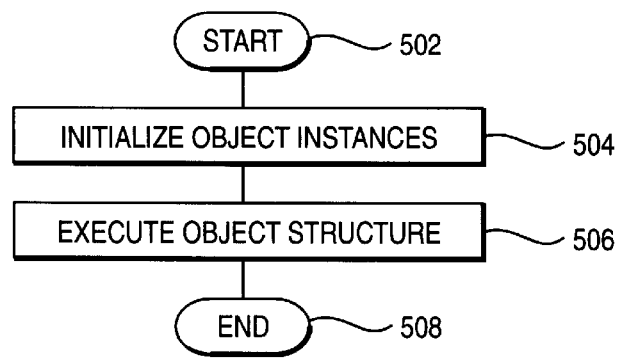
FIG. 5 is a flow diagram illustrating the execution of transformed object oriented code according to the present invention.

Execution of the resulting structure is shown in FIG. 5. Processing starts 502 and moves to object initialization 504. Initialization instantiates the required objects and starts execution of the first object method. Each object method execution returns the index to the next statement method to execute or, in the alternative embodiment, the next statement itself. This process of execution continues 506 until an invalid next statement is returned. Processing then ceases 508.

Figure 6:
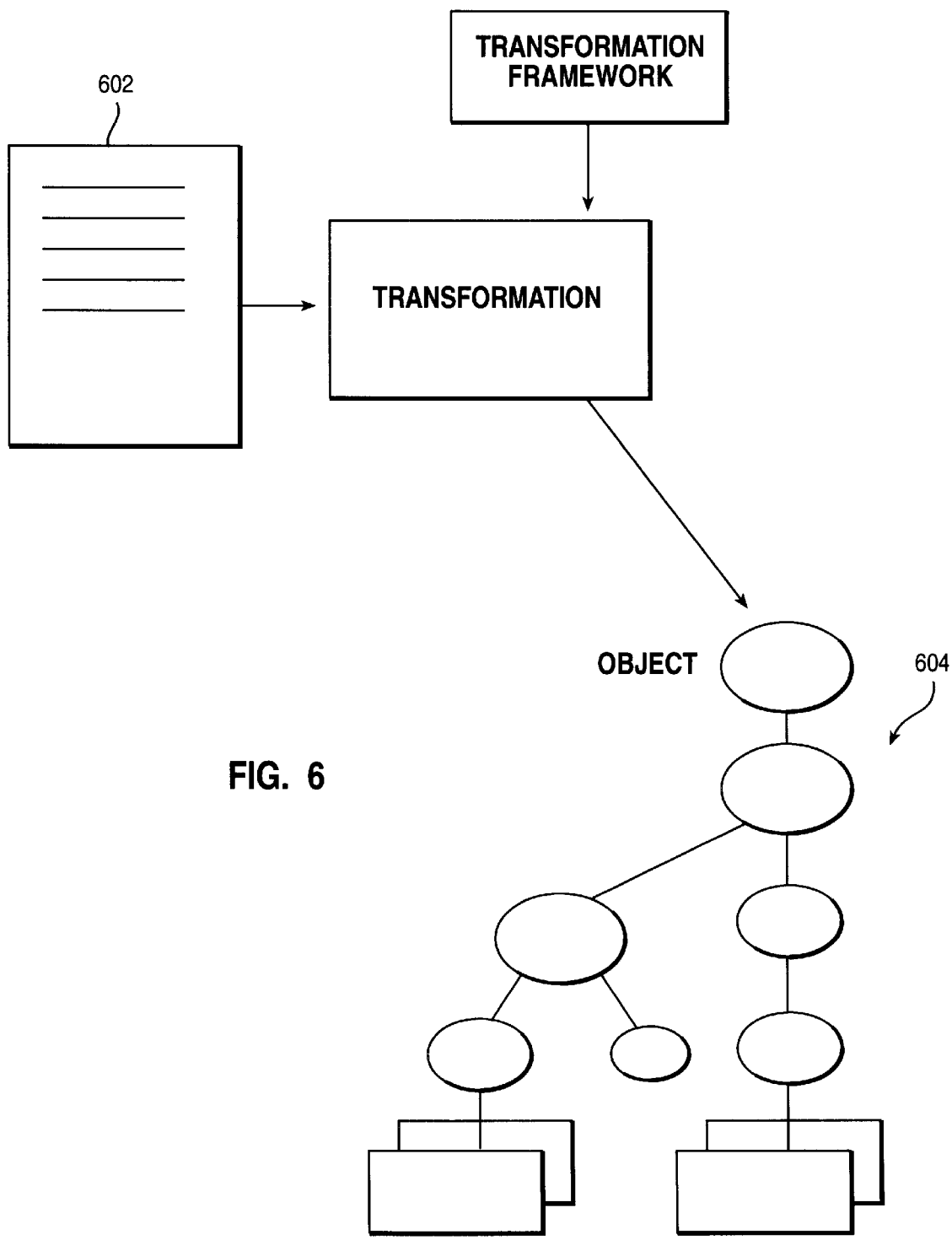
FIG. 6 is a block diagram illustrating the process flow of the present invention.

FIG. 6 illustrates the transformation process that transforms the linear procedural code 602 into the object structure 604. The object structure comprises distinct and different elements than the original procedural code.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method for executing a computer source program written using a GOTO procedural language in an object oriented environment that does not support GOTO control flows, the method comprising the steps of:
   selecting an object oriented framework having an execution granularity;
   transforming, based on said granularity, said source program written using said GOTO procedural language into a plurality of objects each having a plurality of attributes and one or more executable methods;
   creating instances of said objects;
   initiating object method execution by invoking a first method; and
   repeatedly executing object methods in response to each previous method execution until termination is indicated, wherein each method execution returns an indicator indicating which object method to next execute.

2. The method of claim 1, wherein said object oriented framework includes an object for each of a plurality of procedural language statements, and wherein said transforming step comprises:
   selecting an object type matching each procedural language statements; and
   generating object initialization commands to create an instance of said selected object based on parameters of said each procedural language statement.

3. The method of claim 2, wherein said object instances are maintained in an indexed array of objects and wherein said returned indicator is an index to said indexed array.

4. The method of claim 2, wherein said returned indicator is the next object method to invoke.

5. The method of claim 2, wherein said instance creation occurs dynamically only when said object method is invoked for execution.

6. The method of claim 1, wherein said object oriented framework includes an object for each labeled paragraph of said procedural language program and wherein said transforming step comprises:
   generating object definition code for said labeled paragraph containing attributes indicative of said paragraph and at least one executable method having program logic to perform the function defined in said source program;
   initializing instances of labeled paragraph objects based on said object definition code;
   initiating execution of a first object method;
   executing object methods in response to each previously executed method, each executed method returning an indicator indicating a next labeled paragraph to execute.

7. The method of claim 1, wherein said object oriented framework contains a single object representing said source program, said single object having an executable method implementing the program logic of said source program; and wherein said transforming step comprises:
   generating object method logic based on said source program logic, wherein each statement of said source program logic becomes an indexed entry for an indexed branch instruction, and wherein control flow within said method is controlled by modifying a next index value.

8. The method of claim 1, wherein said object oriented framework contains a single object representing said source program, said single object having an executable method implementing the program logic of said source program; and wherein said transforming step comprises:
   generating object method logic based on said source program logic, wherein each block of said source program logic becomes a block of method code at an indexed entry for an indexed branch instruction, and wherein control flow within said method is controlled by modifying a next index value.

9. A computer program product having a computer readable medium having computer program logic recorded thereon for transforming procedural language source code having GOTO control flows into executable GOTO-less object oriented code, said computer program product comprising:
   computer readable program product means for causing a computer to select an object oriented framework having a transformation granularity;

computer readable program product means for causing a computer to receive and parse each of a plurality of procedural language source code statements;

computer readable program product means for causing a computer to generate object definition code, including attributes and method code, in response to said object oriented framework and said parsed plurality of procedural language source code statements;

computer readable program product means for causing a computer to generate object initialization means in response to said object oriented framework and said parsed plurality of procedural language source code statements;

computer readable program product means for causing a computer to initiate method execution by invoking a first method;

computer readable program product means for causing a computer to invoke a next method :specified as a return from each executed method until the return is invalid.

10. The computer program product means of claim 9, wherein said object definition code defines an object for each statement type in said source, and wherein each statement of said source code is transformed into an instance of a statement object having parameters based on said source code.

11. The computer program product means of claim 10, wherein said object definition code defines a single object for each program, and wherein said method code generated for said object method includes an indexed branch statement for controlling code logic flow.

12. A system for generating executable object oriented code in response to a selected code granularity and a goto based source code program, the system comprising:

memory means for storing code;

memory means for storing an object structure representative of said selected code granularity; means for transforming based on said granularity said source program written using said GOTO procedural language into a plurality of objects each having a plurality of attributes and one or more executable methods and processor means for analyzing said goto based source code program and generating object oriented code definitions into said memory means in response to said selected code granularity.

13. The system of claim 12, wherein said selected code granularity causes transformation of each source code statement into an object instance having attributes based on said source code statement parameters.

14. The system of claim 13, further comprising:

execution means for initializing and executing said object oriented code definitions causing creation of object instances and execution of object methods.

15. The system of claim 14, wherein each object is loaded into said memory means only when required for object method execution.

16. The system of claim 14 wherein said execution flow is controlled by each object method returning an index to a next executable statement in the order of the procedural source code control flow.

17. The system of claim 14, wherein said execution flow is controlled by each object method returning the next object method to be executed in the order of the procedural source code control flow.

18. The system of claim 12, wherein said selected granularity causes transformation of each labeled paragraph into a paragraph object.

19. The system of claim 18, wherein said transformation creates virtual paragraphs to represent entry points internal to a paragraph.

20. The system of claim 18, wherein said transformation implements entry points internal to a paragraph by double dispatching.

* * * * *

UNITED STATES PATENT AND TRADEMARK OFFICE
CERTIFICATE OF CORRECTION

PATENT NO : 6,002,874
DATED : December 14, 1999
INVENTOR(S): Bahrs et al

It is certified that error appears in the above-identified patent and that said Letters Patent is hereby corrected as shown below:

Column 22, Example 12, after "[maxStackSize]" insert --;--.

Signed and Sealed this

Twelfth Day of December, 2000

*Attest:*

Q. TODD DICKINSON

*Attesting Officer*     *Director of Patents and Trademarks*